United States Patent [19]

Yokogama

[11] Patent Number: 5,532,988
[45] Date of Patent: Jul. 2, 1996

[54] TRACKING APPARATUS FOR SAMPLED SERVO SYSTEM WHICH PERFORMS TRACKING CONTROL USING SIGNALS IDENTIFYING TRACKS AS EVEN OR ODD NUMBERED

[75] Inventor: Fumihiko Yokogama, Tsurugashima, Japan

[73] Assignee: Pioneer Electronic Corporation, Tokyo, Japan

[21] Appl. No.: 328,000

[22] Filed: Oct. 24, 1994

[30]     Foreign Application Priority Data

Oct. 29, 1993  [JP]  Japan ................................. 5-272051

[51] Int. Cl.$^6$ ................................................. G11B 7/095
[52] U.S. Cl. ................................. 369/44.28; 369/44.29; 369/44.26
[58] Field of Search ........................... 369/44.28, 44.29, 369/32, 44.25, 44.26, 44.13, 44.34

[56]                 References Cited

U.S. PATENT DOCUMENTS 4,817,073  3/1989  Suzuki .............................. 369/44.28
4,819,219  4/1989  Nagano .................................. 369/32
4,980,877  12/1990  Sugiyama et al. ................... 369/44.41
5,164,646  11/1992  Tawaragi et al. .................... 369/44.28

*Primary Examiner*—Aristotelis Psitos
*Assistant Examiner*—Thang V. Tran
*Attorney, Agent, or Firm*—Sughrue, Mion, Zinn, Macpeak & Seas

[57]                 ABSTRACT

A tracking apparatus for a sampled servo system, wherein a tracking servo loop is opened when a jump command is generated by ceasing to supply a tracking error signal to a tracking control circuit, which is instead supplied with a kick pulse to start a track jump operation. Thereafter the tracking control circuit is reset to relay the tracking error signal when a read track is switched causing a change in value of an odd/even determining signal to close the tracking servo loop. Finally a brake pulse is supplied to the tracking control circuit for terminating the track jump operation. This enables an irradiating spot to be stably led into a target track when the track jump operation is switched back to the tracking servo operation even if the track pitch of the disk being read is variable.

8 Claims, 7 Drawing Sheets

TRACKING APPARATUS FOR SAMPLED SERVO SYSTEM WHICH PERFORMS TRACKING CONTROL USING SIGNALS IDENTIFYING TRACKS AS EVEN OR ODD NUMBERED

BACKGROUND OF THE INVENTION

1. Field of the Invention

The present invention relates to a tracking apparatus which is applied to a player for playing an optical disc having a recording format for a sampled servo system, and more particularly to a tracking apparatus which has a one-track jump function.

2. Description of the Related Art

When a conventional tracking apparatus jumps one track on a disc, a tracking servo loop is first opened, and a kick pulse is applied to a driving circuit of a tracking actuator. In response, an information reading position, which is the position irradiated by a light beam spot emitted from a pickup to the disc, is moved in a radial direction of the disc. Thereafter, when a zero-cross point of a tracking error signal is detected, the generation of the kick pulse is stopped, and a brake pulse is instead generated to return the tracking servo loop to a closed state. A one-track jump control as described above is disclosed, for example, in Japanese Patent Publication No. 3-3289.

In a track jump operation performed by a conventional tracking apparatus, a zero-cross point of the tracking error signal changes if the track pitch of a disc is variable, and the pulse width of the kick pulse also varies correspondingly. However, since the pulse width of the brake pulse is usually constant, a maximum value of the jump speed may become too high when the pulse width of the kick pulse is larger than normal. Thus, when the jump operation is switched back to a tracking servo operation, an emitted spot is not smoothly led into an adjacent target track, thus causing an unstable tracking operation.

SUMMARY OF THE INVENTION

It is an object of the present invention to provide a tracking apparatus for a sampled servo system which stabilizes a lead-in operation for an emitted spot to a target track at the time a jump operation is switched to a tracking servo operation even if the track pitch on a disc is variable.

The tracking apparatus of the present invention is provided for use with a player for playing an optical disc having a recording format for a sampled servo system, on which a track identifying pit indicative of an odd-numbered track or an even-numbered track is formed together with wobble pits for tracking servo in a servo field of each of preformatted tracks, and is characterized by reading means for emitting a light beam for reading information recorded as pits on each track of the optical disc; tracking error signal generating means for generating a tracking error signal in accordance with read signals corresponding to the wobble pits produced by the reading means; means for generating an odd/even determining signal indicative of an odd-numbered track or an even-numbered track in accordance with the read signals corresponding to the wobble pits produced by the reading means; relay means for relaying the tracking error signal, generating a kick pulse for a track jump in response to a jump command, outputting the kick pulse instead of the tracking error signal, restoring to the relaying state of the tracking error signal in accordance with a change in contents of the odd/even determining signal, and generating and outputting a brake pulse for terminating the track jump; and tracking control means for controlling movement of an irradiating spot formed by a light beam from the reading means on the optical disc in a radial direction of the optical disc in accordance with an output from the relay means.

In the tracking apparatus of the present invention, a tracking servo loop is opened when a jump command is generated by ceasing to supply the tracking error signal to the tracking control means and instead supplying the tracking control means with the kick pulse to start a track jump operation. Thereafter, the tracking control means is restored, to thereby relay the tracking error signal when a read track is switched, causing a change in contents of the odd/even determining signal to close the tracking servo loop. After this, the brake pulse is supplied to the tracking control circuit for terminating the track jump operation.

DETAILED DESCRIPTION OF THE PREFERRED EMBODIMENTS

An embodiment of the present invention will hereinafter be described in detail with reference to the accompanying drawings.

Figure 1:
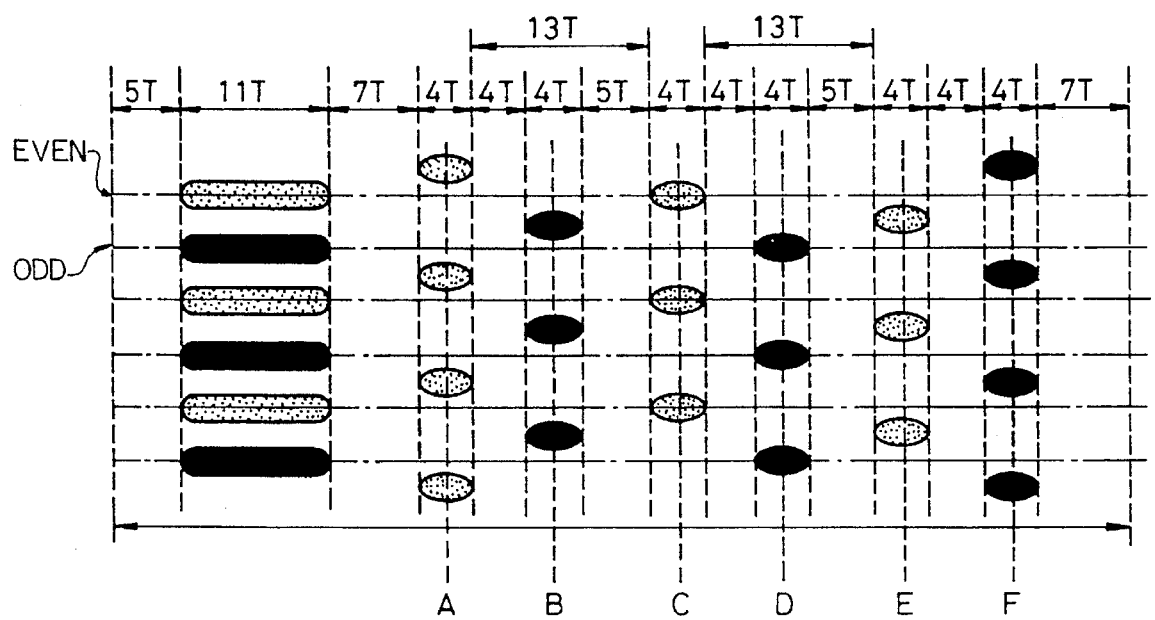
FIG. 1 is a diagram showing servo fields formed on a double-density-recording CAV-type optical disc.

FIG. 1 shows pits formed in respective servo fields on a double-density-recording CAV (Constant Angular Velocity) type optical disc. In each segment of each track on the disc, a servo field is formed as prepits. In FIG. 1, respective tracks are formed at intervals of, for example, 0.4 μm. At the head of the first segment in each track, a synchronizing pit having a length of 11T (T is one bit interval) is formed and followed by a plurality of pits for tracking servo. On each odd-numbered track, a first tracking pit having a length of 4T is placed at an interval of 15T from the trailing edge of the synchronizing pit, as indicated by a shaded ellipse in FIG. 1. This first tracking pit is positioned as a wobble pit and shifted to the left from the center of the track toward the end of the segment. At an interval of 13T from the trailing edge of the first tracking pit, a clock pit having a length of 4T (and also shaded) is placed on the track. Further, at an interval of 13T from the trailing edge of the clock pit, a second tracking pit having a length of 4T (also shaded) is placed as a wobble pit and shifted to the right from the center of the track toward the end of the segment. On each even-numbered track, a first tracking pit having a length of 4T is placed at an interval of 7T from the trailing edge of the synchronizing pit as indicated by a speckled ellipse in FIG. 1. This first tracking pit is positioned as a wobble pit and shifted to the left from the center of the track toward the end of the segment. At an interval of 13T from the trailing edge of the first tracking pit, a clock pit having a length of 4T (and also speckled) is placed on the track. Further, at an interval of 13T from the trailing edge of the clock pit, a second tracking pit also speckled is placed as a wobble pit and shifted to the right from the center of the track toward the end of the segment. The wobble pit is centered at a position displaced by 0.2 μm, by way of example, from the center of the track. Behind the servo field as described above, a data field (not shown) is positioned.

Figure 2:
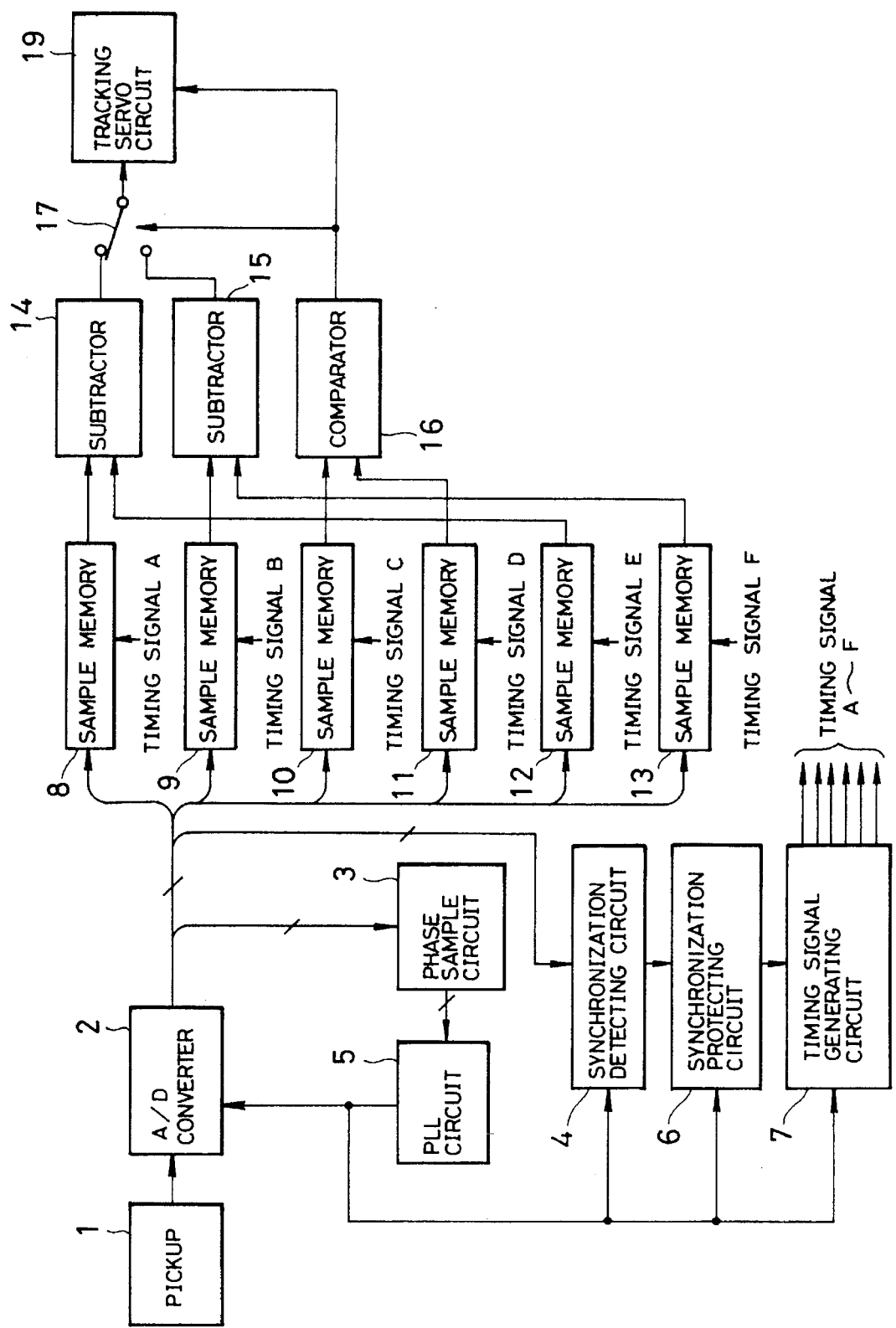
FIG. 2 is a block diagram showing an embodiment of the present invention.

A tracking apparatus shown in FIG. 2 is provided in a player for playing a disc having the servo field shown in FIG. 1. This tracking apparatus is supplied with a RF signal or a read signal taken by a pickup 1 from a disc. The RF signal is converted to a digital RF signal by an A/D converter 2, and then supplied to a phase sample circuit 3 and a synchronization detecting circuit 3. The phase sample circuit 3 calculates a difference between sampled values before and after a clock pit waveform in the digital RF signal in order to derive phase information. The phase sample circuit 3 is connected to a PLL (Phase Lock Loop) circuit 5 which reproduces a clock signal from the phase information. This clock signal is supplied to the A/D converter 2 as a sampling signal.

The synchronization detecting circuit 4 detects a signal corresponding to a synchronizing pit from the digital RF signal output from the A/D converter 2. The synchronizing pit is detected on the basis of the fact that the length of the synchronizing pit is larger than the longest pit of data pits. The synchronization detecting circuit 4 is connected to a synchronization protecting circuit 6 which generates a reference timing signal on the basis of a time point at which the synchronizing pit was detected by the synchronization detecting circuit 4. The reference timing signal is supplied to a timing signal generating circuit 7. The synchronization detecting circuit 4, the synchronization protecting circuit 6 and the timing signal generating circuit 7 are supplied with a clock signal from the PLL circuit 5 such that these circuits operate in synchronism with the clock signal.

The timing signal generating circuit 7 generates six timing signals A–F in accordance with the reference timing signal. A generating time of the timing clock A corresponds to a position separated by 9T from the trailing edge of the synchronizing pit; a generating time of the timing clock B corresponds to a position separated by 8T from the generating time of the timing clock A; a generating time of the timing signal C corresponds to a position separated by 9T from the generating time of the timing clock B; a generating time of the timing signal D corresponds to a position separated by 8T from the generating time of the timing signal C; a generating time of the timing signal E corresponds to a position separated by 9T from the generating time of the timing signal D; and a generating time of the timing signal F corresponds to a position separated by 8T from the generating time of the timing signal E. In other words, as indicated by references A–F in FIG. 1, the timing signal A is generated when an irradiating spot emitted by the pickup 1 lies in a radius-directional position of a disc including the first tracking pit on an even-numbered track; the timing signal B is generated when the irradiating spot lies in a radius-directional position of the disc including the first tracking pit on an odd-numbered track; the timing signal C is generated when the irradiating spot lies in a radius-directional position of the disc including the clock pit on the even-numbered track; the timing signal D is generated when the irradiating spot lies in a radius-directional position of the disk including the clock pit on the odd-numbered track; the timing signal E is generated when the irradiating spot lies in a radius-directional position of the disc including the second tracking pit on the even-numbered track; and the timing signal F is generated when the irradiating spot lies in a radius-directional position of the disc including the second tracking pit on the odd-numbered track.

The A/D converter 2 is further connected with six sample memories 8–13. In order for each of the sample memories 8–13 to determine a time at which it stores an output signal of the A/D converter 2, the sample memory 8 is supplied with the timing signal A; the sample memory 9 with the timing signal B; the sample memory 10 with the timing signal C; the sample memory 11 with the timing signal D; the sample memory 12 with the timing signal E; and the sample memory 13 with the timing signal F. Once each of the sample memories 8–13 stores an output signal of the A/D converter 2 in response to its associated timing signal, it continuously outputs the stored signal until a subsequent signal is next stored thereinto.

The outputs of the sample memories 8, 12 are connected to a subtractor 14, while the outputs of the sample memories 9, 13 are connected to a subtractor 15. The subtractor 14 subtracts an output signal of the sample memory 12 once stored therein from an output signal of the sample memory 8 once stored therein. The subtractor 15 subtracts an output signal of the sample memory 13 once stored therein from an output signal of the sample memory 9 once stored therein. The outputs of the sample memories 10, 11 are connected to a comparator 16. The comparator 16 compares the levels of signals stored in the respective sample memories 10, 11, and generates an odd/even determining signal indicative of whether a currently spotted track is an odd-numbered or even-numbered track. This odd/even determining signal goes to high level when indicating an odd-numbered track and goes to low level when indicating an even-numbered track.

The outputs of the subtractors 14, 15 are connected to a change-over switch 17. The change-over switch 17 selectively relays one of output signals of the subtractors 14, 15 to a tracking servo circuit 19 in accordance with the contents of the odd/even determining signal. A signal relayed by the change-over switch 17 is a tracking error signal.

With the constitution described above, a RF signal read from a disc by the pickup 1, after being digitized by the A/C converter 2, is supplied to the sample memories 8–13. When the timing signal A is output from the timing signal generating circuit 7, that is, when an irradiating spot emitted from the pickup 1 lies in a radius-directional position of the disc including the first tracking pit on an even-numbered track, the digital RF signal at that time is stored into the sample memory 8. When the timing signal B is output, that is, when the irradiating spot emitted by the pickup 1 lies in a radius-directional position of the disc including the first tracking pit on an odd-numbered track, the digital RF signal at that time is stored into the sample memory 9. Also, when the timing signal C is output, that is, when the irradiating spot from the pickup 1 lies in a radius-directional position of the disc including the clock pit on the even-numbered track, the digital RF signal at that time is stored into the sample memory 10. When the timing signal D is output, that is, when the irradiating spot emitted by the pickup 1 lies in a radius-directional position including the clock pit on the odd-numbered track, the digital RF signal at that time is stored into the sample memory 11. When the timing signal E is output, that is, when the irradiating spot emitted by the pickup 1 lies in a radius-directional position including the second tracking pit on the even-numbered track, the digital RF signal at that time is stored into the sample memory 12. Further, when the timing signal F is output, that is, when the irradiating spot emitted by the pickup 1 lies in a radius-directional position including the second tracking pit on the odd-numbered track, the digital RF signal at that time is stored into the sample memory 13.

Figure 3:
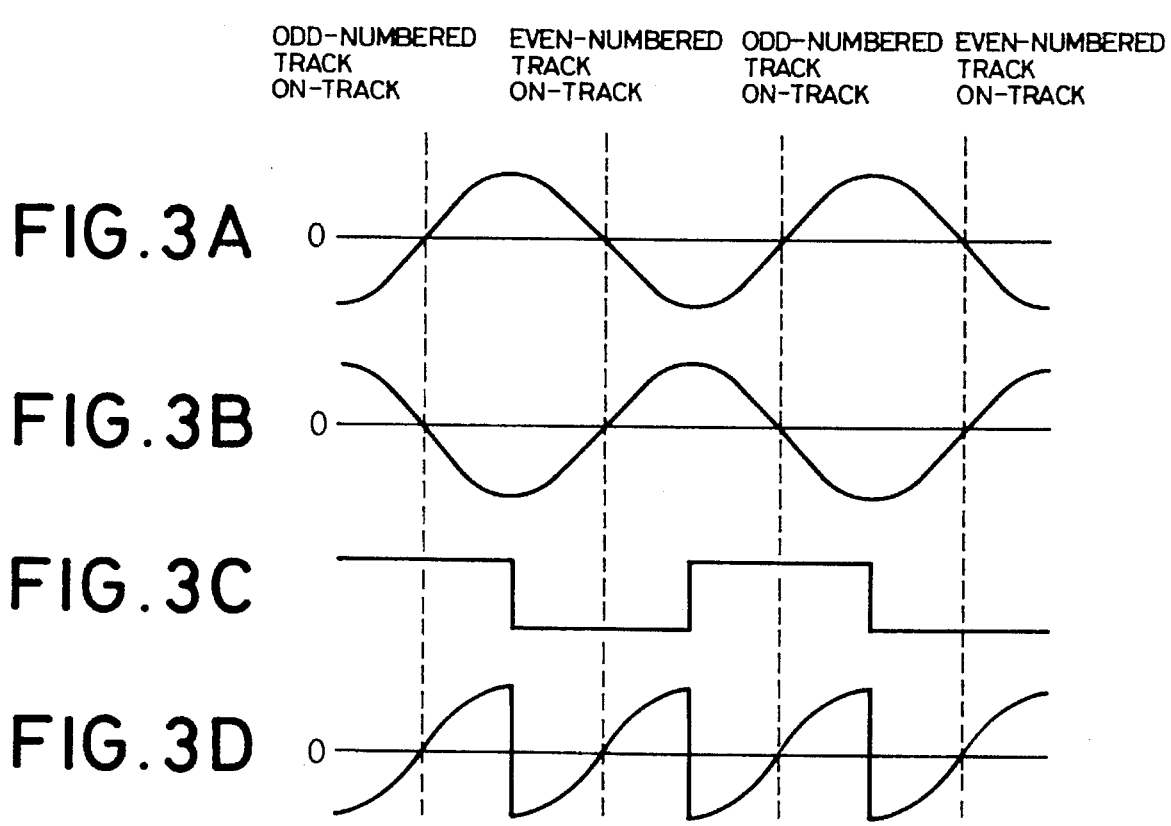
FIGS. 3A–3D are waveform charts showing respective signals at different locations in a tracking apparatus of FIG. 2.

The levels of the respective RF signals stored into the sample memories 8, 12 correspond to the first and second tracking pits on the even-numbered track, respectively. Thus, if the irradiating spot emitted by the pickup 1 is positioned on the center of the track, these RF signals present the same levels. As the irradiating spot emitted by the pickup 1 deviates from the center of the track in either of the radial directions to approach to one of the first and second tracking pits, the level of the RF signal corresponding to the one tracking pit becomes higher. Therefore, the subtractor 14 subtracts the output signal stored in the sample memory 12 from the output signal stored in the sample memory 8 to derive a first sinusoidal wave signal as shown in FIG. 3A. Likewise, the levels of the respective RF signals stored into the sample memories 9, 13 correspond to the first and second tracking pits on the odd-numbered track, respectively. Thus, if the irradiating spot emitted by the pickup 1 is positioned on the center of the track, these RF signals present the same levels. The subtractor 15 subtracts the output signal stored in the sample memory 13 from the output signal stored in the sample memory 9 to derive a second sinusoidal wave signal as shown in FIG. 3B which has the phase reverse to that of the first sinusoidal wave signal.

The levels of the respective RF signals stored in the sample memories 10, 11 correspond to the clock pits on the even- and odd-numbered tracks, respectively. If the irradiating spot emitted by the pickup 1 is positioned on the center of the even-numbered track, the level of the RF signal stored in the sample memory 10 is maximum, while the level of the RF signal stored in the sample memory 11 is minimum. Conversely, if the irradiating spot emitted by the pickup 1 is positioned on the center of the odd-numbered track, the level of the RF signal stored in the sample memory 10 is minimum, while the level of the RF signal stored in the sample memory 11 is maximum. If the irradiating spot is positioned substantially in the center between the odd- and even-numbered tracks, the levels of the RF signals stored in the sample memories 10, 11 are substantially the same. The levels of the RF signals stored in the sample memories 10, 11 are compared by the comparator 16 which generates the odd/even determining signal representative of the result of the comparison. The odd/even determining signal is at high level when the irradiating spot emitted by the pickup 1 is in a range from the center between the tracks to the center between the next tracks through the odd-numbered track, and at a low level when the irradiating spot is in a range from the center between the tracks to the center between the next tracks through the even-numbered track, as shown in FIG. 3C.

The switch 17 relays the first sinusoidal wave signal representative of the output signal of the subtractor 14 when the odd/even determining signal is at high level, and relays the second sinusoidal wave signal representative of the output signal of the subtractor 15 when the odd/even determining signal is at low level. In this way, as shown in FIG. 3D, every time an edge of the tracking determining signal appears, the first and second sinusoidal wave signals are alternately switched and output to the tracking servo circuit 19 as the tracking error signal.

It should be noted that the waveforms shown in FIGS. 3A–3D are generated when a jump operation is performed in the forward direction, i.e., from the inner periphery to the outer periphery of the disc. If the jump operation is performed in the reverse direction from the outer periphery to the inner periphery of the disc, the signals will be reverse in phase to those generated when the jump direction is the forward direction.

Figure 4:
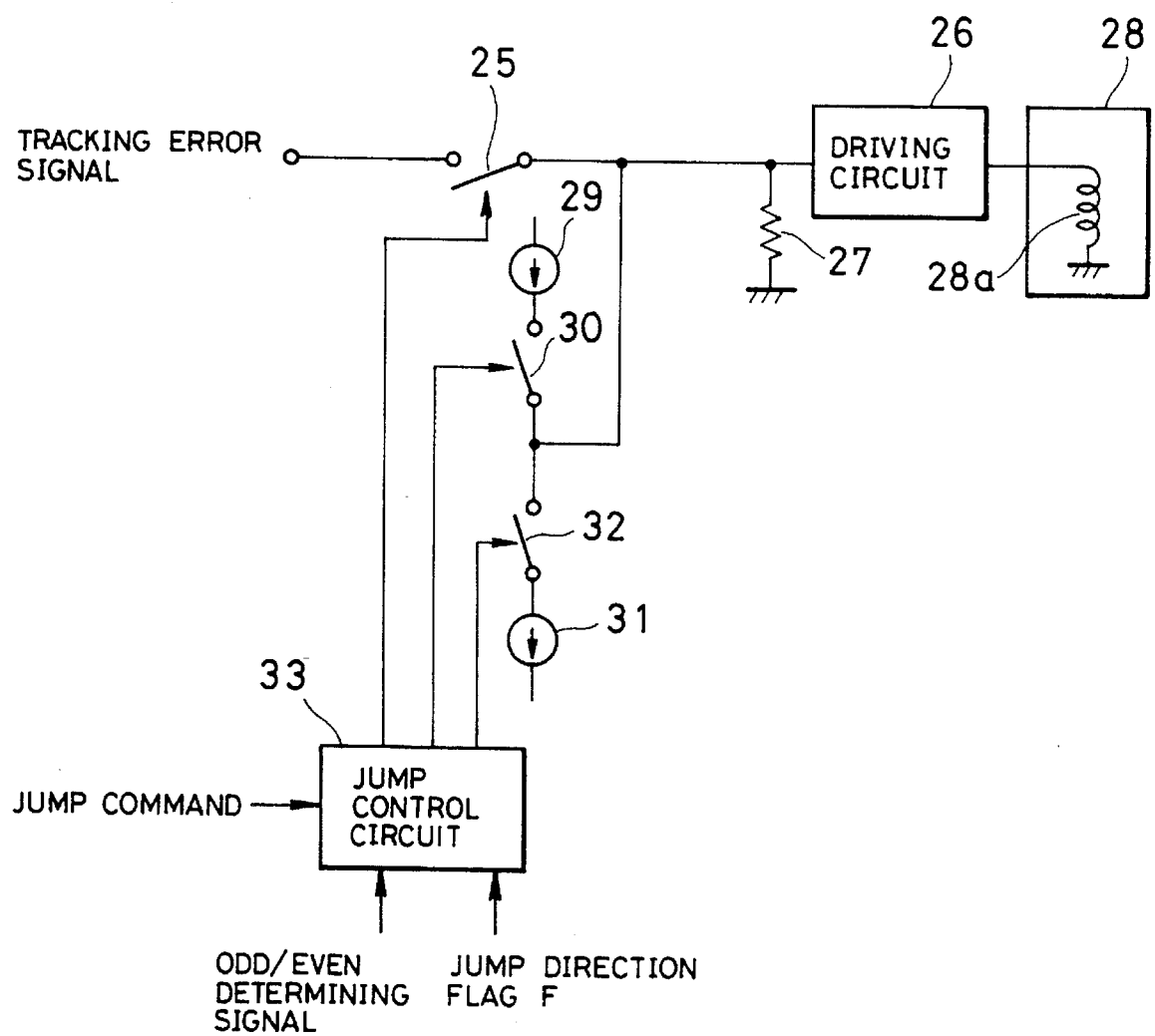
FIG. 4 is a diagram showing the constitution of a tracking servo circuit.

Next, the tracking servo circuit 19 will be explained with reference to FIG. 4. In the tracking servo circuit shown in FIG. 4, the tracking error signal output from the tracking error signal generating circuit is supplied to a driving circuit 26 through a switch 25. A line connecting the switch 25 to the driving circuit 26 is grounded through a resistor 27. The driving circuit 26 drives a tracking actuator 28 in the pickup 1 in accordance with a voltage applied to the resistor 27. In the tracking actuator 28, a current flowing through a driving coil 28a causes a force to be generated for driving an objective lens in a radial direction of a disc against a spring, not shown.

The line connecting the switch 25 to the driving circuit 26 is also connected with a current source 29 through a switch 30 and a current source 31 through a switch 32. The current source 29 allows a current $I_1$ to flow from the connecting line into the resistor 27 when the switch 30 is on, while the current source 31 operates such that a current 12 flows from the ground into the resistor 27 when the switch 32 is on. The magnitudes of these currents $I_1$, $I_2$ are the same. The switches 25, 30, 32 are controlled by a jump control circuit 33 which consists of a microcomputer. The jump control circuit 33 is supplied with a jump command and the odd/even determining signal. The jump command is generated by a system controller (not shown) for controlling the entire disc player.

In the tracking servo circuit constituted as described above, the switch 25 is turned on in a tracking operation in which the irradiating spot from the pickup 1 moves following a track, wherein the tracking error signal output from the switch 17 is supplied to the driving circuit 26 through the switch 25. The driving circuit 26 drives the tracking actuator 28 so as to reduce the level of the tracking error signal to zero.

Figure 5:
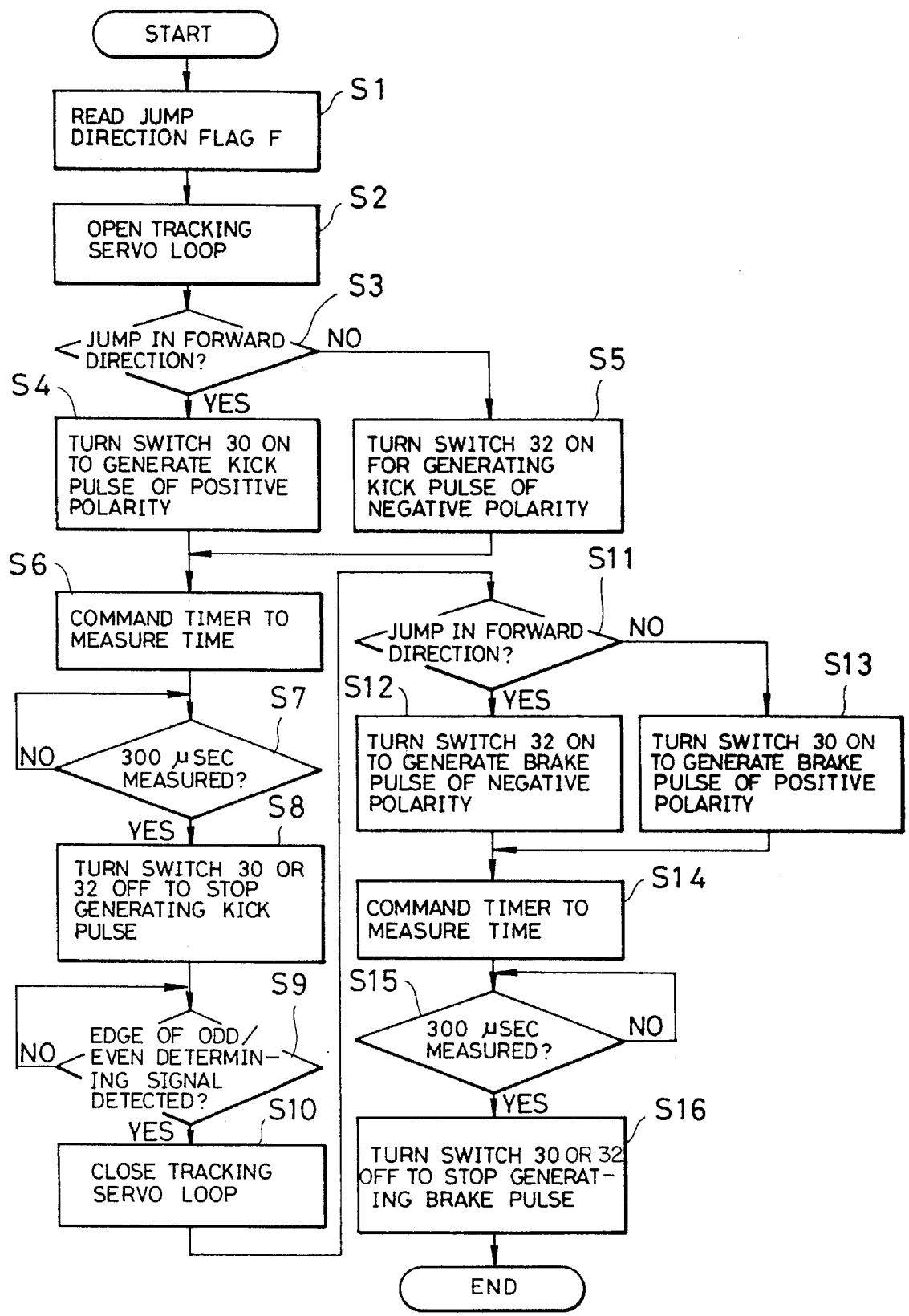
FIG. 5 is a flow chart showing the operation of a jump control circuit.

On the other hand, when the jump control circuit 33 is supplied with a jump command, a jump operation is performed, wherein the irradiating spot emitted by the pickup 1 moves by jumping a track in the radial direction of the disc. In this jump operation, the jump control circuit 33 first reads a jump direction flag F from the system controller (step S1) as shown in FIG. 5. The jump direction flag F is set by the system controller on the basis of the relation between a current read track position and an adjacent target track to be jumped. In this setting, the jump direction flag F is set to zero if the target track is located in the forward direction from the current read track position of the pickup 1, and to one if in the reverse direction.

The jump control circuit 33, after reading the jump direction flag F, turns off the switch 25 in order to open the tracking servo loop (step S2), and determines whether or not the read jump direction flag F indicates the forward direction (step S3). The jump control circuit 33 turns the switch 30 on if the jump direction flag F indicates the forward direction (step S4), and turns the switch 32 on if it indicates the reverse direction (step S5). When the switch 30 is in on state, the current $I_1$ from the current source 29 flows into the resistor 27 through the switch 30. The driving circuit 26 is thus applied with a positive voltage which serves as a kick pulse of positive polarity. On the other hand, if the switch 32 is in on state, the current 12 flows into the resistor 27 in the direction from the ground to the current source 31. The driving circuit 26 is thus applied with a negative voltage which serves as a kick pulse of negative polarity. The driving circuit 26, supplied with the kick pulse in positive polarity or negative polarity thus generated, drives the tracking actuator 28 in the radial direction of the disc determined by the polarity of the kick pulse, in which direction the irradiating spot emitted by the pickup 1 jumps.

After executing steps S4 or S5, a timer, not shown, provided in the jump control circuit 33 is commanded to start measuring the time (step S6). Then, it is determined whether the timer has measured 300 μsec (step S7). If the timer has measured 300 μsec, the switch 30 or 32 is turned off, to stop generating the kick pulse (step S8). After stopping the generation of the kick pulse, it is determined whether or not an edge of the odd/even determining signal is detected (step S9).

If the edge of the odd/even determining signal is detected following reversal of the level of the odd/even determining signal, the switch 25 is turned on to close the tracking servo loop (step S10), and it is again determined whether or not the jump direction flag F indicates the forward direction (step S11). In order to effect braking, the switch 32 is turned on if the jump direction flag F does indicate the forward direction (step S12), and the switch 30 is turned on if it indicates the reverse direction (step S13). When the switch 32 is in on state, the current 12 flows into the resistor 27 in the direction from the ground to the current source 31. The driving circuit 26 is thus supplied with a negative voltage which serves as a brake pulse of negative polarity. On the other hand, if the switch 30 is in on state, the current $I_1$ from the current source 29 flows into the resistor 27 through the switch 30. The driving circuit 26 is thus supplied with a positive voltage which serves as the brake pulse of positive polarity. The driving circuit 26, supplied with the brake pulse in negative polarity or positive polarity, drives the tracking actuator 28 to a radial direction of the disc determined by the polarity of the brake pulse, thus prohibiting the irradiating spot emitted by the pickup 1 from moving in the jump direction.

After executing step S12 or S13, the timer, not shown, provided in the jump control circuit 33 is commanded again to start measuring the time (step S14), and it is determined whether or not the timer has measured 300 μsec (step S15). When the timer has measured 300 μsec, the switch 30 or 32 is turned off, to stop generating the brake pulse (step S16).

Figure 6A:
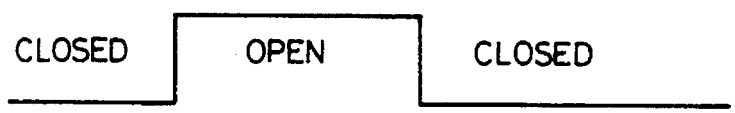
FIGS. 6A–6D are timing charts showing associated signals when a jump operation is performed.
Figure 6B:
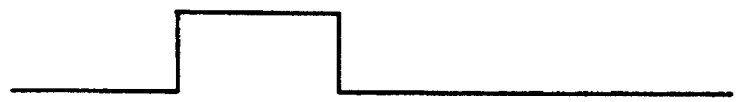
Figure 6C:
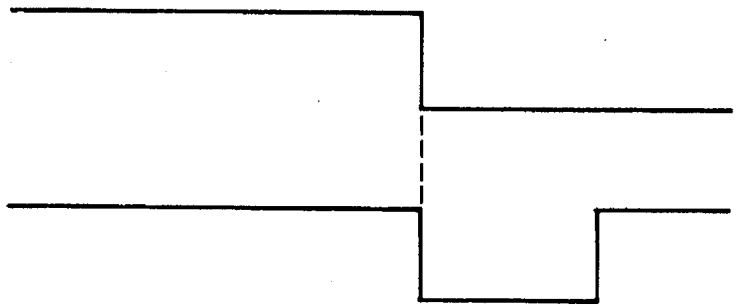
Figure 6D:
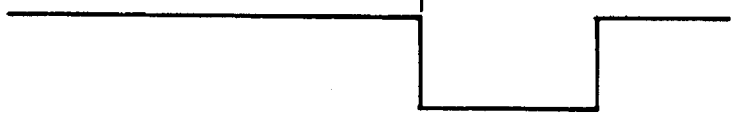

The jump operation as described above may be represented by timing charts of FIGS. 6A–6D showing the open/closed state of the tracking servo pulse, the kick pulse, the odd/even determining signal, and the braking pulse. More specifically, when a jump command is generated, the tracking servo loop is immediately set in an open state, as shown FIG. 6A, and then the kick pulse is generated as shown in FIG. 6B. The kick pulse has a pulse width of 300 μsec. After generating the kick pulse, when the odd/even determining signal reverts from high level to low level as shown in FIG. 6C, the tracking servo loop is returned to the closed state as shown in FIG. 6A, and, simultaneously with this, the brake pulse having the opposite polarity to that of the kick pulse is generated as shown in FIG. 6D. The brake pulse also has a pulse width of 300 μsec.

Figure 7:
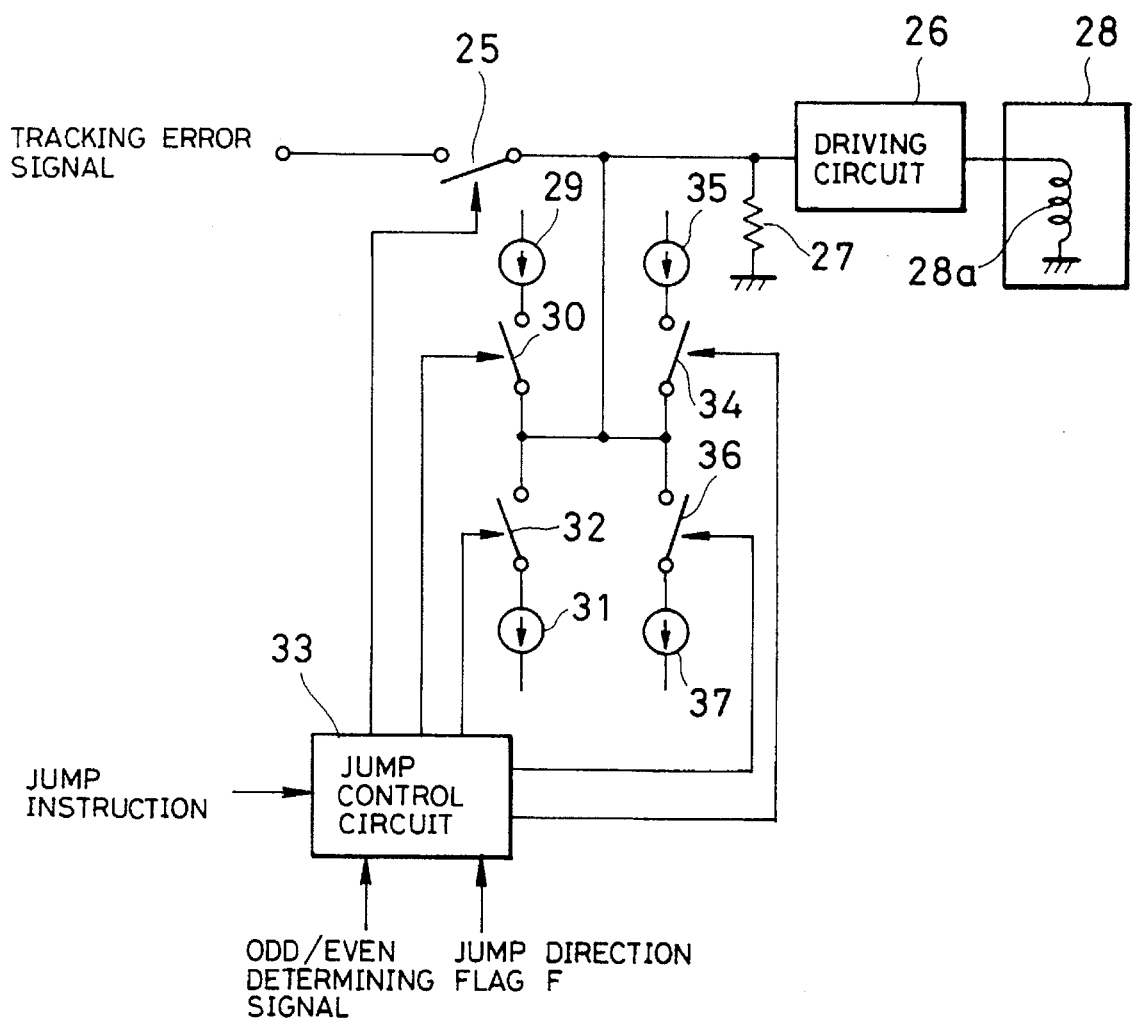
FIG. 7 is a diagram showing another exemplary constitution of a tracking servo circuit.

Incidentally, in the foregoing embodiment, after the kick pulse having the pulse width of 300 μsec has been generated, the brake pulse is not generated until an edge of the odd/even determining signal is detected. Alternatively, a pulse having the same polarity as the kick pulse at a low voltage merely sufficient to overcome a restoring force exerted by a spring of the tracking actuator 28 may be applied in order to hold a jump speed for a period until the brake pulse is generated after the generating of the kick pulse is stopped. For example, as shown in FIG. 7, after the switch 30 is turned off to stop generating the kick pulse of positive polarity, the jump control circuit 33 turns the switch 34 on to supply a current $I_3$ from a current source 35 to the resistor 27 until an edge of the odd/even determining signal is detected. Conversely, when the switch 32 is turned off to stop generating the kick pulse of negative polarity, the jump control circuit 33 turns the switch 36 on to supply a current $I_4$ from a current source 37 to the resistor 27 until an edge of the odd/even determining signal is detected.

While in the foregoing embodiment, the kick pulse and the brake pulse have a pulse width of 300 μsec, this is a mere example, and the present invention is not limited to this particular pulse width.

Also, while the foregoing embodiment has been described in connection with a double-density-recording optical disc as an optical disc, it is apparent that the present invention may also be applied to a single-density-recording optical disc.

As described above, according to the present invention, when a jump command is generated, the tracking control means is inhibited from being supplied with the tracking error signal to open the tracking servo loop. Then, movement of an irradiating spot to an adjacent target track in the radial direction of a disc is accelerated by the kick pulse. After the kick pulse has disappeared, the irradiating spot continuously moves by inertia. In response to a change in value of the odd/even determining signal, the tracking servo loop is closed, and the brake pulse is generated for terminating the track jump operation to position the irradiating spot at a target track. In this way, even if the track pitch varies, the irradiating spot can be smoothly led into the target track when the jump operation is switched to a tracking servo operation, thus reducing a time required for the lead-in.

Further, unlike prior art apparatuses which require a circuit for digitizing a tracking error signal for detecting a zero-cross point of the tracking error signal, the present invention has the added advantage that it does not need such a digitizing circuit.

What is claimed is:

1. A tracking apparatus for use with a player for playing an optical disc having a recording format for a sampled servo system, on which a track identifying pit indicative of an odd-numbered track or an even-numbered track is formed together with wobble pits for tracking servo in a servo field of each of a plurality of preformatted tracks, comprising:

reading means for emitting a light beam for reading information recorded as pits on each track of said optical disc and producing read signals corresponding to said wobble pits;

tracking error signal generating means for generating a tracking error signal in accordance with said read signals produced by said reading means;

means for generating an odd/even determining signal indicative of an odd-numbered track or an even-numbered track in accordance with said read signals produced by said reading means;

tracking control means for controlling movement of an irradiating spot formed by the light beam from said reading means on said optical disc in a radial direction of said optical disc, said tracking control means being controlled by any of (a) said tracking error signal, (b) a kick pulse, and (c) a brake pulse; and relay means for (a) relaying said tracking error signal to said tracking control means, (b) in response to a jump command input to said relay means, generating said kick pulse for a track jump and outputting said kick pulse instead of said tracking error signal to said tracking control means, (c) detecting a change in value of said odd/even determining signal, and, in response to said detected change, again relaying said tracking error signal to said tracking control means, and (d) generating and outputting said brake pulse for terminating the track jump to said tracking control means.

2. A tracking apparatus according to claim 1, wherein said kick pulse and said brake pulse generated by said relay means have polarities opposite to each other, and have the same pulse width and the same amplitude.

3. A tracking apparatus according to claim 1, wherein said relay means, after generating said kick pulse, generates, and relays to said tracking control means, a pulse having the same polarity as said kick pulse and an amplitude smaller than that of said kick pulse for a period until said brake pulse is generated.

4. A method for performing a one-track jump function during operation of an optical disc player, said optical disc player provided with an optical disc having a plurality of tracks, each track of said tracks having at least one track-identifying pit for identifying the respective track as an even-numbered track or as an odd-numbered track and having at least one tracking-error pit, comprising:

detecting the tracking-error pit and generating a tracking error signal in accordance with the detected tracking-error pit;

detecting the track-identifying pit and generating an odd/even determining signal in accordance with the detected track-identifying pit;

controlling tracking in accordance with the tracking error signal;

in response to a jump command, terminating said controlling step and generating a kick pulse for initiating the one-track jump;

monitoring the odd/even determining signal for a change in signal status;

when the change in signal status is detected, reinitiating said controlling step, to again control tracking in accordance with the tracking error signal; and generating a brake pulse for terminating the one-track jump.

5. The method according to claim 4, wherein the kick pulse has a predetermined pulse width and a predetermined amplitude, and has a polarity determined by the jump command.

6. The method according to claim 4, wherein the brake pulse has a predetermined pulse width and a predetermined amplitude, and has a polarity determined by the jump command.

7. The method according to claim 4, wherein, if the change in signal status is not yet detected when the kick pulse is completed, said monitoring step further comprises generating a holding pulse until the change in signal status is detected.

8. The method according to claim 7, wherein:

the kick pulse has a predetermined pulse width and a predetermined amplitude, and has a polarity determined by the jump command; and the holding pulse has a predetermined amplitude smaller than the amplitude of the kick pulse and has the polarity of the kick pulse.

* * * * *

UNITED STATES PATENT AND TRADEMARK OFFICE
CERTIFICATE OF CORRECTION

PATENT NO. : 5,532,988
DATED : July 2, 1996
INVENTOR(S) : Fumihiko Yokogawa

It is certified that error appears in the above-indentified patent and that said Letters Patent is hereby corrected as shown below:

Title page, item [75], inventor: change the inventor's name "Yokogama" to --Yokogawa--.

Signed and Sealed this

Nineteenth Day of November, 1996

Attest:

BRUCE LEHMAN

*Attesting Officer*  *Commissioner of Patents and Trademarks*